United States Patent
Petersson et al.

(10) Patent No.: US 12,069,108 B2
(45) Date of Patent: Aug. 20, 2024

(54) VIDEO CONFERENCING SYSTEMS FEATURING END-TO-END ENCRYPTION WATCHDOG

(71) Applicant: Google LLC, Mountain View, CA (US)

(72) Inventors: Daniel Petersson, Stockholm (SE); Artem Vladimirovich Titarenko, Stockholm (SE); James Michael McCollum, Chapel Hill, NC (US); Stefan Lindmark, Stockholm (SE)

(73) Assignee: GOOGLE LLC, Mountain View, CA (US)

( * ) Notice: Subject to any disclaimer, the term of this patent is extended or adjusted under 35 U.S.C. 154(b) by 182 days.

(21) Appl. No.: 17/551,747

(22) Filed: Dec. 15, 2021

(65) Prior Publication Data
US 2023/0188543 A1    Jun. 15, 2023

(51) Int. Cl.
*H04L 65/403*    (2022.01)
*H04L 9/40*    (2022.01)
*H04N 7/15*    (2006.01)

(52) U.S. Cl.
CPC ........ *H04L 65/403* (2013.01); *H04L 63/0428* (2013.01); *H04L 63/1416* (2013.01); *H04L 63/1441* (2013.01); *H04N 7/15* (2013.01)

(58) Field of Classification Search
CPC ............. H04L 63/0428; H04L 63/1416; H04L 63/1441; H04L 65/403; H04L 41/503;
(Continued)

(56) References Cited

U.S. PATENT DOCUMENTS

2015/0095420 A1    4/2015    Haun et al.
2015/0304288 A1*   10/2015   Balasaygun ............ H04L 63/20
                                                         713/151

(Continued)

FOREIGN PATENT DOCUMENTS

CA    2551263         3/2007
CN    112104833 B  *  1/2023  ....... H04N 21/25816
EP    2642711         9/2013

OTHER PUBLICATIONS

International Search Report and Written Opinion for Application No. PCT/US2022/052666, mailed Apr. 17, 2023, 17 pages.
(Continued)

*Primary Examiner* — Quoc D Tran
(74) *Attorney, Agent, or Firm* — DORITY & MANNING P.A.

(57) ABSTRACT

A computing system and method that can be used for a video conferencing system including a watchdog to ensure that all data associated with the video conference is encrypted from end-to-end. In particular, aspects of the present disclosure provide a secure and private approach to conducting remote meetings. For example, the watchdog can monitor the data associated with the video conference, ranging from call setup data to video image and audio data transmitted from one or more client computing devices. In particular, the present disclosure provides a method for ensuring that the video conference data is protected by using multiple steps and monitoring the video conference data while the video conference is ongoing such that remedial measures can be taken immediately when a breach in security is determined.

19 Claims, 4 Drawing Sheets

(58) Field of Classification Search
CPC . H04L 43/06; H04L 43/0829; H04L 43/0852;
H04L 65/65; H04L 41/22; H04L 41/5067;
H04L 43/087; H04L 43/091; H04L 43/12
See application file for complete search history.

(56) References Cited

U.S. PATENT DOCUMENTS

| | | | |
|---|---|---|---|
| 2022/0350516 A1* | 11/2022 | Bono | G06F 3/0641 |
| 2023/0188534 A1* | 6/2023 | Hill | H04L 63/205 |
| | | | 713/150 |

OTHER PUBLICATIONS

International Preliminary Report on Patentability for Application No. PCT/US2022/052666, mailed Jun. 27, 2024, 13 pages.

* cited by examiner

VIDEO CONFERENCING SYSTEMS FEATURING END-TO-END ENCRYPTION WATCHDOG

FIELD

The present disclosure relates generally to multi-attendee video conferencing systems. More particularly, the present disclosure relates to a watchdog component that monitors encryption adherence and efficacy within a video conferencing system that features end-to-end encryption.

BACKGROUND

Video conferencing technologies, sometimes alternatively referred to as video teleconference or videotelephony, include technologies for the reception and transmission of audio and/or visual signals by users in different locations, for communication between people in real time.

Certain video conference users may desire to have their video conferencing data encrypted in an end-to-end fashion. In end-to-end encryption (E2EE), video conferencing data is encrypted from each user's device to each other user's device. Thus, no system on the path between the users should have access to the data. For various reasons, it is important for an E2EE video conference system to adhere to this principle strictly and constantly.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for improving reliability of end-to-end encryption in a video conference. The method comprises a computing system receiving data descriptive of user input requesting initiation of a video conference comprising one or more participants. The method comprises the computing system receiving content transmitted from a client computing device associated with one of the participants of the video conference. The method comprises the computing system evaluating one or more parameters or characteristics of the content received from the client computing device. The method comprises the computing system detecting an error event when the one or more parameters or characteristics of the content are unaligned with an encryption expectation associated with the client computing device. The method comprises the computing system performing one or more remedial operations in response to detection of the error event.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to a video conferencing system that includes a watchdog component that ensures that all data associated with the video conference is effectively encrypted end-to-end. More particularly, in an end-to-end encrypted (E2EE) video conference system, no system or component on the path between the client computing devices associated with the participants of the video conference should have access to the data being transmitted. Therefore, example video conference systems described herein can include a watchdog component that can monitor the data associated with a video conference in a number of different ways to determine whether all of the data streams associated with the devices/users participating in a video conference are consistently and effectively being encrypted. If the watchdog component detects an error event (e.g., an instance in which data does not appear to be encrypted or otherwise does not meet various encryption expectations), then the watchdog component can trigger performance of various remedial operations to rectify the error. For example, the watchdog component can trigger termination of the video conference, disconnection of the user for whom the error event was detected, alerting of the affected users, and/or other operations.

Thus, the video conferencing systems described herein can provide improved user privacy and reliability by monitoring for failures (whether accidental or malicious) within an E2EE video conference. In particular, example aspects of the present disclosure provide a secure and private approach to conducting remote meetings or other conferences. For example, a watchdog component can monitor the data associated with the video conference, ranging from call setup data to video image and audio data transmitted from one or more client computing devices. Remedial actions can be taken to restore privacy and confidence when an error is detected.

More particularly, aspects of the present disclosure enable various interactions to be shared securely between multiple attendees of a video conference. Video conferencing applications may use end-to-end encryption; however, video conferences can be susceptible to computer mistakes/errors (e.g., "bugs"), cyber-attacks, adversaries, user error, etc. Without a robust security system to ensure the security of the video conference, users may not feel comfortable engaging in communication. Furthermore, depending on the video conference context (e.g., workplace, etc.), certain communications and/or conference participants may have various obligations regarding privacy or confidentiality. Embodiments of the present disclosure provide a method for ensuring that the video conference data is protected by using multiple steps and monitoring the video conference data while the video conference is ongoing such that remedial measures can be taken immediately when a deviation from encryption expectations is detected.

In some implementations, a computing system that includes one or more computing devices can facilitate a video conference. For example, a video conference can be triggered in response to data descriptive of user input requesting initiation of a video conference. The video conference can include multiple participants. In particular, a video conferencing system can establish a video conference between multiple client devices (e.g., smartphones, laptops, etc.) that are associated with the multiple participants. In some implementations, one or more server computing devices can cooperatively operate to intermediate and facilitate communications between the client devices.

According to an aspect of the present disclosure, in some implementations, a watchdog component can perform an initial screening prior to establishing/facilitating the video conference between the client devices to ensure that a data stream for a participant is appropriately encrypted. In some implementations, the watchdog component can be situated on and/or implemented by the server computing system. For example, in some implementations, a respective instance of the watchdog component can be implemented by each edge server that is connected to one of the client devices. For example, an edge server can be a server that is part of the group of servers that is facilitating or hosting the video conference and may correspond to the initial server (e.g., from the perspective of data flow) that is aware of the type of content associated with the data being transmitted (e.g., not simply passing the data along as part of backhaul network such as load-balancing servers or the like). In other implementations, the watchdog component may not necessarily be located at the edge server but instead could be implemented in a more centralized location or at the client device. Thus, each instance of a watchdog component can evaluate a single data stream associated with a single user or may respectively monitor multiple data streams associated with multiple users.

As indicated above, in some implementations, the watchdog component can perform an initial screening prior to establishing/facilitating the video conference between the client devices to ensure that a data stream for a participant is appropriately encrypted. In particular, in some implementations, after receiving the user input associated with initiating a video conference, the watchdog component can verify parameters used for an initial video conferencing setup against expected parameters. This process can in some instances be referred to as call setup parameter verification. If the parameters used match the expectations for E2EE calls in the system, then the watchdog can permit the call to be established. However, if the parameters used by a client do not match the expectations for E2EE calls in the system, then the watchdog can deny or otherwise prevent the call from being established.

More particularly, the parameters used for an initial video conferencing setup can be highly dependent on the context of the desired video conference. As one example, the parameters can include the use or lack of use of an extension. As a particular example, the extension can be a dependency descriptor. For instance, the call setup parameters can include the use or lack of use of a descriptor which can resemble inter-frame dependencies in a video flow, where a constructor parameter, method parameter, or field parameter can be wrapped such that unified access to metadata is granted. As another example, the call setup parameters can include the use, lack of use, or particular configuration of a codec. For instance, the codec can compress or decompress media files such as audio or video data based on the particular configuration. As yet another example, the call setup parameters can include the configuration of a packetizer. For instance, a transmitting device can packetize the data and each packet can be routed through a network to its destination. As examples, a fixed length packet length could be used (e.g., 1024 bits), or a variable length packet can be used. As one particular example, individual packets can take different routes to the destination and can arrive at the destination out of order. As another particular example, packets can have different formats. In particular, a packetizer can embed inter-frame dependencies within a packet. The destination computing system can verify the correctness of the data in each packet (e.g., verify if an inter-frame dependency is present or not) and reassemble the original item before presenting the data to the receiving computing application.

The watchdog can use some or all of the parameters described above to assess whether the call setup parameters associated with a client match expectation. For example, in some implementations, the watchdog component can determine whether all of the parameters match an expected value or behavior and if any of the parameters do not match the expected value or behavior then an error event can be detected. In other implementations, the watchdog component can determine a confidence score for a client device based on the number of parameters that do or do not match the expected values or behavior. The watchdog can detect an error event when the confidence score for the client falls below a threshold value. On the other hand, if the watchdog determines that the call setup parameters sufficiently match expectations, then the watchdog can permit the call to be established.

According to another aspect of the present disclosure, the watchdog component can also operate continuously during the video conference to ensure that E2EE standards are satisfied throughout the duration of the call. Thus, during a video conference call, the video conferencing system can receive content (e.g., encrypted content) from each of a number of client devices associated with the participants of the video conference. The content (e.g., encrypted content) associated with each client device can be transmitted or routed through the watchdog component and the watchdog component can monitor the content (e.g., encrypted content). For example, the content (e.g., encrypted content) can be monitored as the content (e.g., encrypted content) is transmitted by/received from each client device and before it is transmitted to the other client devices.

The watchdog component can evaluate characteristics of the data received from each client device to determine whether encryption expectations are met. As one example, the watchdog component can continuously evaluate the data received from each client to determine whether an expected protocol is being used. Specifically, in some examples, a portion of a stream of bytes can be analyzed to determine the protocol(s) used by the transmitting device (e.g., the client device). Thus, the content can be monitored for the use of an expected protocol. As a particular example, the protocol can be the use of secure media frames. In particular, the watchdog component can evaluate the first or last packet payloads to determine if transmitted content uses secure media frames. Furthermore, upon determining that the transmitted content uses secure media frames, a message authentication code can be verified as well. For example, the message authentication code can be located at the end of the secure media frame. In particular, an encryption key may be used. As another example, invariants can be evaluated. As another example, the protocol can be the use of secure real-time transport protocol. If the protocol(s) used match the expectations for E2EE calls in the system, then the watchdog can permit the call to be continued. However, if the protocol(s) used by a client do not match the expectations for E2EE calls in the system, then the watchdog can detect an error event and trigger remedial operations.

According to another aspect of the present disclosure, the watchdog component can detect an error event when content contained within the stream of content is unaligned with an encryption expectation. As one example, the computing system can analyze other static characteristics or dynamic characteristics of the data stream received from each client device to determine whether encryption expectations are met. As one example, a counter parameter included in a client device's data stream can be expected to increase in a particular fashion (e.g., monotonically). Therefore, if the counter parameter behaves in an unexpected way (e.g., increases in an irregular or outside of a window of non-monotonic fashion), then an error event can be detected. Other static characteristics or dynamic characteristics of the data stream can be monitored as well.

As another example, the watchdog component can look for a known byte string within an encrypted stream and detect an error event if the known byte stream is identified. In particular, each client device can be instructed to include a known byte stream in its data prior to encryption of the data by the client device. Then, following encryption of the data by the client device, the encrypted data stream can be received from the one or more client computing devices and evaluated by the watchdog component. If the known byte string is detected by the watchdog, it can be an indication that the data associated with the client computing device has not been correctly encrypted.

Specifically, in some implementations, the known byte string can be inserted into a predetermined location of the data associated with the client device. For example, the byte string can be inserted into a client secure media frame library. As further examples, the predetermined location(s) can be at the beginning of a portion of data (e.g., beginning of each frame) or at the end of a portion of data (e.g., end of each packet of data). In such fashion, only the predetermined location(s) (e.g., beginning of data, end of data, etc.) need to be monitored/evaluated by the watchdog to determine if the client computing device is correctly encrypting the data. In some implementations, the known byte string may be required to be determined by the watchdog in a predetermined number of frames (e.g., number of consecutive frames) associated with the client computing device before being flagged as incorrect encryption. This can reduce false positives.

In some implementations, a longer or shorter known byte string can be inserted into the data associated with the client device. In particular, a longer known byte string can result in a higher confidence in encryption error detection. On the other hand, a shorter known byte string can use less computational resources such as network bandwidth. In some implementations, the known byte string can be adjusted based at least in part on available computational resources. Specifically, in some implementations, the known byte string can be inserted on a frame by frame basis.

The watchdog can use some or all of the characteristics described above to assess whether the ongoing call data characteristics associated with a particular client match encryption expectation. For example, in some implementations, the watchdog component can determine whether all of the characteristics match an expected value or behavior and if any of the characteristics do not match the expected value or behavior then an error event can be detected. In other implementations, the watchdog component can determine a confidence score for a client device based on the number of characteristics that do or do not match the expected values or behavior. The watchdog can detect an error event when the confidence score for the client falls below a threshold.

As described above, a watchdog component can monitor video conferencing data at various times and/or in various manners to identify an error event associated with an E2EE video conference. When an error event is detected, the watchdog component can trigger performance of various remedial operations. As one example, remedial operations can include disconnecting the one or more clients transmitting the content unaligned with the encryption expectation associated with the error event. Stated differently, if data associated with a particular client does not meet expectations, then the particular client can be disconnected from the call. As another example, remedial operations can include providing an error message for display to one or more client computing devices. In one example, the error message can be provided to the one or more client computing devices associated with the error event. In another example, the error message can be provided to every client computing device participating in the video conference. In yet another example, the error message can be provided to the client computing device associated with moderating/owning the video conference.

As yet another example, remedial operations can include preventing the connection of the one or more clients transmitting the content unaligned with the encryption expectation associated with the error event. For example, if the call setup parameters for a particular client do not meet expectations, then the particular client can be denied entry to the video conference. As yet another example, remedial operations can include generating a log of the error event. The log can provide a record that can be used to determine when a conference was and was not E2EE. As yet another example, remedial operations can include any user-defined action input by the user. For example, users can define actions to be taken (or not) in response to detection of an error event.

Thus, the present disclosure provides a computing system and method that can be used to provide video conferences with improved privacy and reliability. More particularly, example aspects of the present disclosure involve computing systems and computer-implemented methods for facilitating an end-to-end encrypted video conference between one or more participants in which participants can have improved confidence in the initial and ongoing E2EE nature of the conference.

The systems and methods of the present disclosure provide a number of technical effects and benefits. As one example of a technical effect, the proposed techniques are able to provide a more secure and private video conference. In particular, the proposed systems can result in improved encryption consistency within video conferences and protect the system from both inadvertent and intentional malfunction. This corresponds to an improvement in the functioning of a computer system itself. Further, by improving encryption adherence for each client device, the number of dropped calls or other misalignments in participant device configuration can be reduced, thereby saving computational resources such as processor usage, memory usage, network bandwidth, etc., which would otherwise be required to establish calls between misaligned participants.

Furthermore, the video conferencing system enables video conferences to proceed while assuring that the data is safely encrypted at all times during the video conference. Furthermore, the watchdog can process only data from a predetermined location of video/audio streams to search for unencrypted data. In this manner, computing efficiencies including reduced bandwidth, reduced processor usage, reduced memory usage, etc. can be provided for a secure video conference system.

Furthermore, the present disclosure opens the door to increased usage of virtual workplaces. In particular, the virtual workplace can replicate many desirable attributes of working in person while cutting down on the undesirable attributes. By leveraging the proposed techniques in a virtual workplace, users can communicate with others in a secure fashion as when discussing confidential matters in person, thus reducing frustration, and optimizing collaboration. By optimizing virtual collaboration, the proposed techniques allow users to be engaged in their workplace while reducing the rate and/or volume of data transmissions between devices. In particular, by reducing the number of transmissions collaborators need to send to each other to achieve the same level of cohesion and idea production, the proposed systems can save additional computational resources (e.g., processor usage, memory usage, network bandwidth, etc.).

While the term video conference is used in the present disclosure, this term includes situations where one or more participants participate in a conference without the use of video (e.g., a video conference includes the situation where a user is participating in the conference with their camera "turned off" or otherwise without a video signal). In such situations, the watchdog can monitor the data associated with the audio data transmitted by the client computing devices.

Further, although the descriptions above are provided with specific reference to video conferences, on some implementations, the computing system can perform the previously described methods and processes for other contexts or forms of data (e.g., textual data, telephone audio data, etc.) As an example, one or more participants can participate in a message system and the watchdog can monitor the data (e.g., encrypted data) associated with the textual data transmitted by the client computing devices.

With reference now to the Figures, example embodiments of the present disclosure will be discussed in further detail.

Example Devices and Systems

Figure 1:
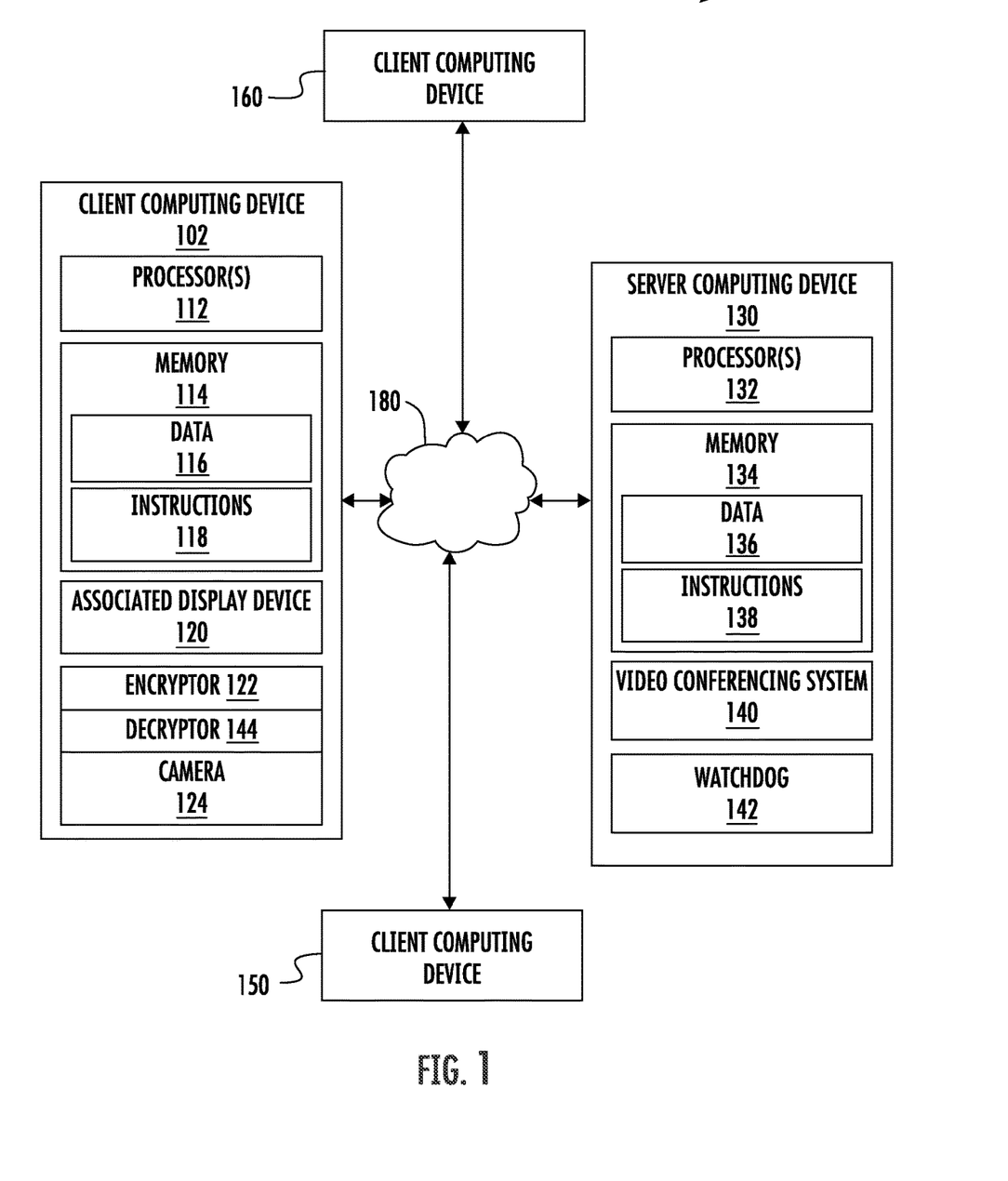
FIG. 1 depicts a block diagram of example computing systems according to example embodiments of the present disclosure.

FIG. 1 depicts an example client-server environment 100 according to example embodiments of the present disclosure. The client-server environment 100 includes client computing devices 102, 150 and 160 and a server computing system 130 that are connected by and communicate through a network 180. Although three client computing devices 102, 150 and 160 are depicted, any number of client computing devices 102, 150 and 160 can be included in the client-server environment 100 and connect to server computing system 130 over a network 180.

In some example embodiments, the client computing devices 102, 150 and 160 can be any suitable device, including, but not limited to, a smartphone, a tablet, a laptop, a desktop computer, or any other computer device that is configured such that it can allow a user to participate in a video conference. The client computing devices 102, 150 and 160 can include one or more processor(s) 112, memory 114, an associated display device 120, a video conferencing application 122, and a camera 124.

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the client computing device 102 and the server computing system 130 (e.g., one or more video conferencing applications 122, etc.). The client computing devices 102, 150 and 160 can implement the instructions to execute aspects of the present disclosure, including directing communications with server computing system 130, providing video stream data to a user, and processing requests from users for execution of a multi-interaction display.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130), that can be retrieved, manipulated, created, or stored by the one or more processor(s) 112. In some example embodiments, such data can be accessed and displayed to one or more users of the client computing devices 102, 150 and 160 during a video conference or transmitted to the server computing system 130.

The client computing devices 102, 150 and 160 can execute a video conferencing application 122. The video conferencing application can capture image data from a camera 124 and transmit that data to the server computing system. For example, the client computing device 102 can receive from the server computing system 130 image data from one or more other participants of the video conference (e.g., other client computing devices 150 and 160). The client computing device 102 can then display the received image data to users of the client computing device 102 on associated display device 120. In some example embodiments, the camera 124 collects image data from one or more users. The camera can be any device capable of capturing visual data.

More particularly, the client computing devices 102, 150 and 160 can receive one or more video stream data from the server computing system 130. The client computing devices 102, 150 and 160 can, as an example, decrypt the one or more video stream data received from the server computing system 130 with a decryptor 144. The client computing device 102 can, as an example, display the decrypted video stream data in the associated display device 120 (e.g., a laptop display device, a smartphone display device, a communicatively connected display device, etc.).

Additionally, or alternatively, in some implementations, the client computing devices 102, 150 and 160 can generate video stream data, encrypt the video stream data with an encryptor 122 (e.g., as specified by instructions 118, etc.), and send the encrypted video stream data to the server computing system 130 (e.g., via network(s) 180). More particularly, the client computing devices 102, 150 and 160 can capture video stream data using camera 124 (e.g., an integrated webcam, communicatively connected camera device, etc.).

In accordance with some example embodiments, the server computing system 130 can include one or more processor(s) 132, memory 134, video conferencing system 140, and a watchdog component 142. The memory 134 can store information accessible by the one or more processor(s) 132, including instructions 138 that can be executed by processor(s) and data 136.

The server computing system 130 can be in communication with one or more client computing device(s) 102, 150 and 160 using a network communication device that is not pictured. The network 180 can be any type of communications network, such as a local area network (e.g., intranet), wide area network (e.g., Internet), or some combination thereof. In general, communication between the client computing device 102 and the server computing system 130 can be carried via network interface using any type of wired and/or wireless connection, using a variety of communication protocols (e.g., TCP/IP, UDP, HTTP, RTP, RTCP, etc.), encodings or formats (e.g., HTML, XML), and/or protection schemes (e.g., VPN, secure HTTP, SSL, SRTP).

In accordance with some example embodiments, within the client-server environment 100, the watchdog component 142 can ensure that all data associated with the client-server environment 100 is effectively encrypted from end-to-end by the encryptor 122. In particular, in an end-to-end encrypted (E2EE) video conference system, no system or component on the path between the client computing devices 102, 150 and 160 associated with the participants of the video conference should have access to the data being transmitted. Therefore, a watchdog component 142 can monitor the data associated with a client-server environment 100 in a number of different ways to determine whether all of the data streams associated with the client computing devices 102, 150 and 160 participating in a video conference are consistently and effectively being encrypted by the encryptor 122. If the watchdog component 142 detects an error event (e.g., an instance in which data does not appear to be encrypted or otherwise does not meet various encryption expectations), then the watchdog component 142 can trigger performance of various remedial operations to rectify the error. For example, the watchdog component can trigger termination of the video conference, disconnection of the user for whom the error event was detected, alerting of the affected users, and/or other operations.

The watchdog component 142 can be implemented in hardware, software, and/or firmware. For example, the watchdog component 142 can include or be embodied by computer-readable instructions stored on a non-transitory computer-readable medium.

The server computing system 130 can include a video conferencing system 140. In some implementations, the video conferencing system 140 can be configured to facilitate operation of the video conferencing application 122 executed by one or more client computing devices 102, 150 and 160. As an example, the video conferencing system 140 can receive video stream data from a plurality of client computing devices 102, 150 and 160 (e.g., via network 180) respectively associated with a plurality of video conference attendees. As a further example, the watchdog component 142 can monitor the video stream data from the plurality of client computing devices 102, 150 and 160 (e.g., via network 180) respectively associated with the plurality of video conference attendees. The video conferencing system 140 can provide the video stream data to each of the client computing devices 102, 150 and 160. Further, the video conferencing system 140 can manage provided stream data quality. In some implementations, the video conferencing system 140 can manage provided stream data quality by transmitting requests to client computing devices 102 to provide video stream data with a certain quality and/or resolution. In such fashion, the server computing system 130 can utilize video conferencing system 140 to facilitate the functionality of the video conferencing applications 122 on each client computing device 102, 150 and 160.

Example System Operation

Figure 2:
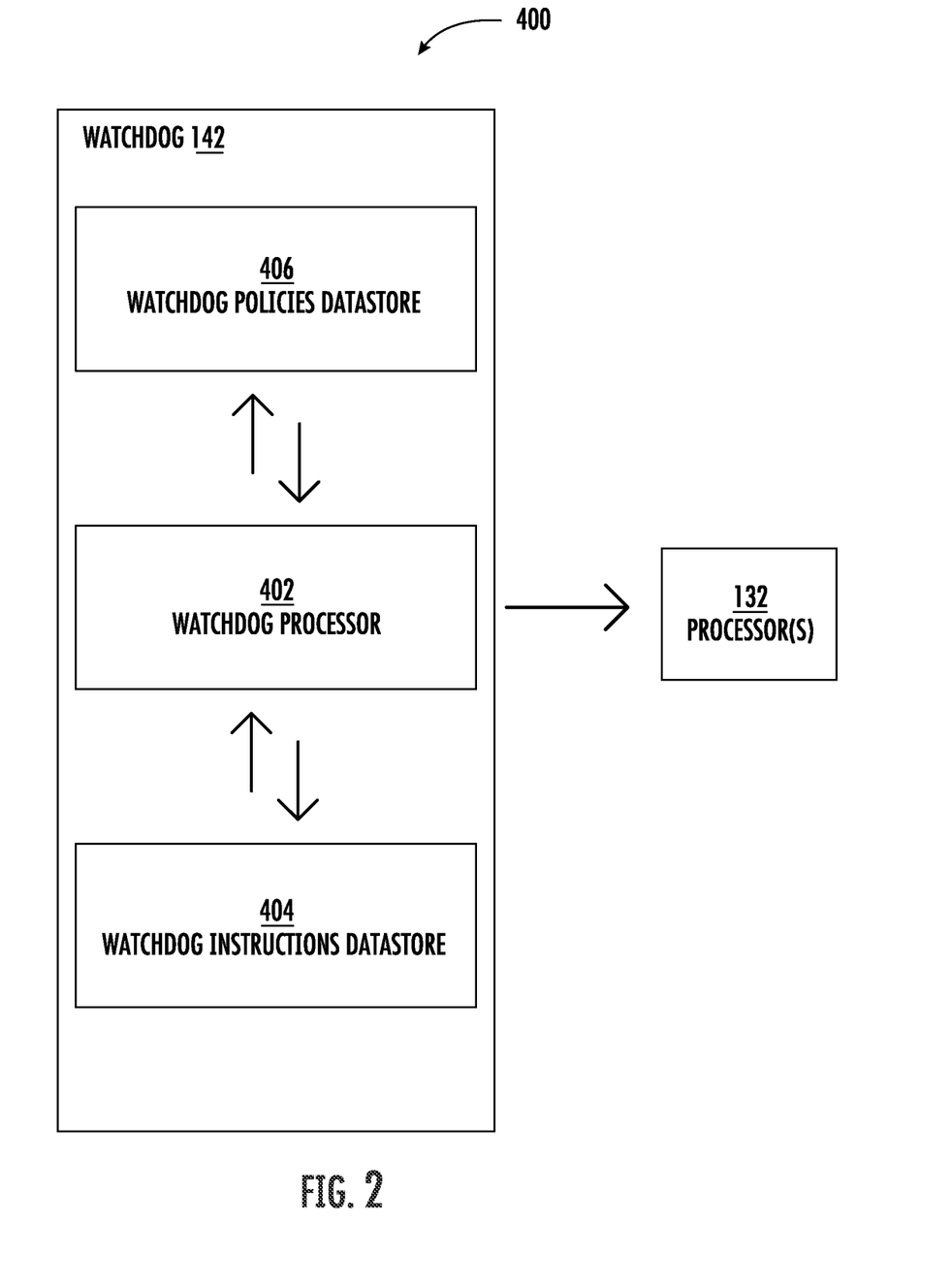
FIG. 2 depicts a block diagram of an example watchdog computing system according to example embodiments of the present disclosure.
Figure 3:
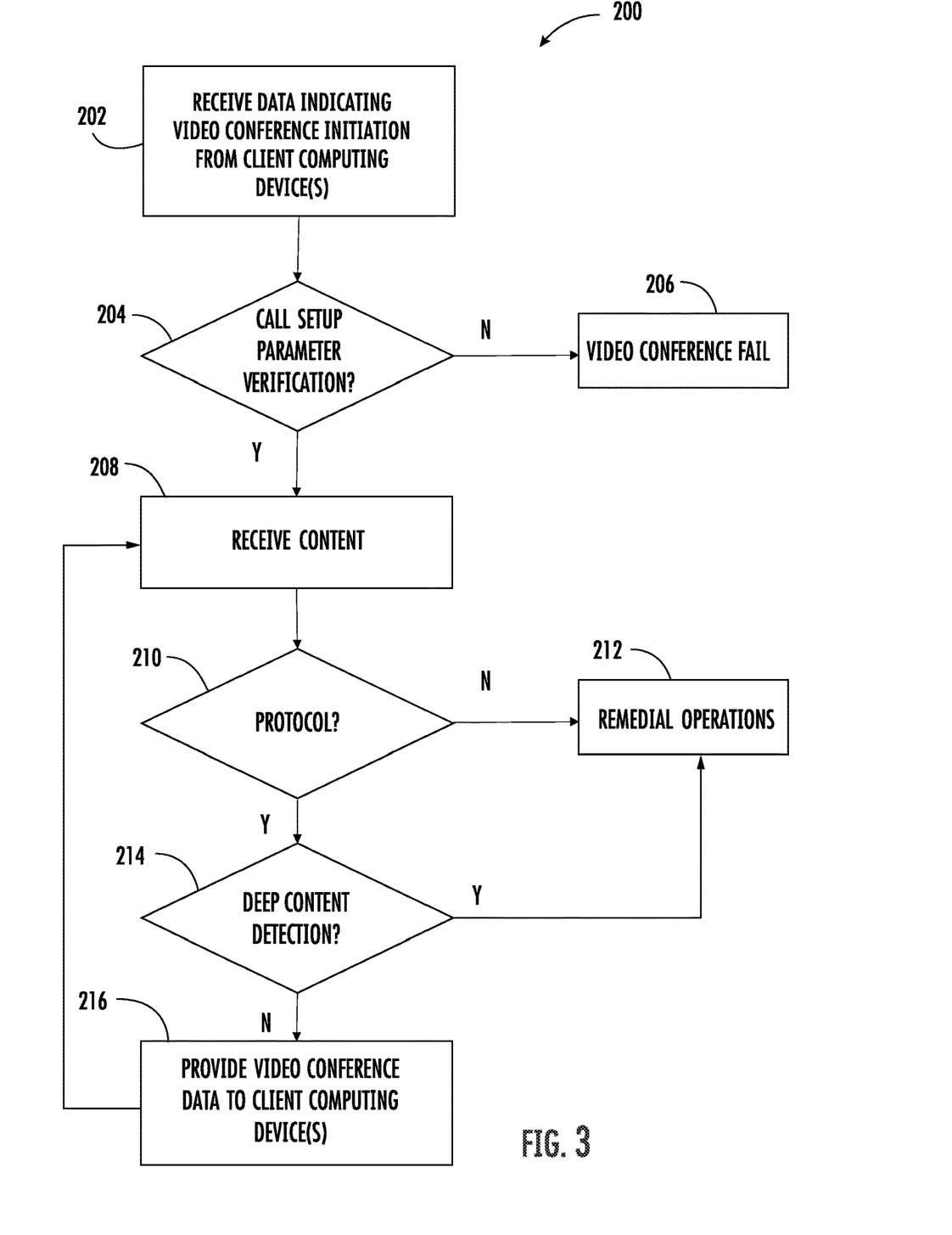
FIG. 3 depicts a block diagram of an example watchdog application according to example embodiments of the present disclosure.

FIG. 3 depicts a block diagram of an example generalized watchdog implementation according to example embodiments of the present disclosure. Although FIG. 3 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure. FIG. 3 will now be discussed with reference to FIG. 2 which depicts a block diagram of an example generalized watchdog 142 according to example embodiments of the present disclosure. In some implementations, the watchdog 142 can operate in conjunction with the processor(s) 132 of the server computing system 130 as discussed in FIG. 1.

In some implementations, a watchdog 142 can include a watchdog processor 402, a watchdog instructions datastore 404, and a watchdog policies datastore 406 as depicted in FIG. 2. The instructions from the watchdog instructions datastore 404 can cause the watchdog processor 402 to monitor data exchanges being processed by the processor(s) 132 from FIG. 1. For example, as referenced in FIG. 1, video conference data can be transmitted to the server computing system 130 from a client computing device 102 and then be distributed to one or more client computing device(s) 102, 150 and 160. Even more particularly, the transmitted data may be encrypted (e.g., by the encryptor 122).

At 202, the processor(s) 132 can receive data indicating video conference initiation from a client computing device 102. In particular, the data indicating video conference initiation can include video conference parameters. Even more particularly, the data indicating video conference initiation can be transmitted to the watchdog 142.

At 204, the watchdog 142 can conduct a call parameter verification. In some implementations, the watchdog processor 402 can compare video conference parameters received by the processor(s) 132 with expected video conference parameters. For example, the expected video conference parameters can be stored in the watchdog policies datastore 406. In particular, based on the result of the comparison between the expected video conference parameters from the watchdog policies datastore 406 and the received video conference parameters, watchdog processor 402 can receive instructions from watchdog instructions datastore 404 to transmit to the processor 132.

At 206, if the received video conference parameters do not align with the expected video conference parameters from the watchdog policies datastore 406, the watchdog processor 402 can transmit to the processor(s) 132 instructions to prevent initiation of the video conference (e.g., based on instructions transmitted from the watchdog instructions datastore 404).

At 208, if the received video conference parameters do align with the expected video conference parameters from the watchdog policies datastore 406, the watchdog processor 402 can transmit to the processor(s) 132 instructions to initiate the video conference (e.g., based on instructions transmitted from the watchdog instructions datastore 404). In particular, initiating the video conference can allow the server computing system 130 to receive content from the one or more client computing device(s) 102, 150 and 160. Even more particularly, the processor(s) 132 can transmit the content to the watchdog 142.

At 210, the watchdog processor 402 can determine if the content leverages a predetermined protocol. For example, the predetermined protocol can be stored in the watchdog policies datastore 406. In particular, the watchdog processor 402 can compare the content to the predetermined protocol received from the watchdog policies datastore 406. As a specific example, the watchdog processor 402 can determine if the content leverages a secure media frame protocol.

At 212, if the received content does not align with the predetermined protocol from the watchdog policies datastore 406, the watchdog processor 402 can transmit to the processor(s) 132 instructions for remedial operations (e.g., disconnect, restart, error message, prevent connection, log, etc.) from the watchdog instructions datastore 404.

At 214, if the received content does align with the predetermined protocol from the watchdog policies datastore 406, or in cases, in tandem, the watchdog processor 402 can monitor the content for unencrypted content. In particular, the watchdog processor 402 can search for a known byte string within the content. Even more particularly, a known byte string can be stored in the watchdog policies datastore 406 such that the watchdog processor 402 can compare the encrypted data with the known byte string. The known byte string can be input into the content by the client computing device(s) 102, 150 and 160. Even more particularly, the known byte string can be input in predetermined locations of the content (e.g., by the client computing device(s) 102, 150 and 160). In some implementations, the watchdog processor 402 can only process content associated with the predetermined locations.

If the watchdog processor 402 finds the known byte string, the same process as described at 212 can occur.

At 216, if the received content does not contain unencrypted content including the known byte string, the watchdog processor 402 can transmit to the processor(s) 132 instructions from the watchdog instructions datastore 404 allowing the processor(s) 132 to distribute the video conference data to the client computing device(s) 102. As an example, upon allowing the processor(s) 132 to distribute the video conference data to the client computing device(s) 102, 150 and 160, the watchdog processor 402 can receive more content as in 208.

Example Methods

Figure 4:
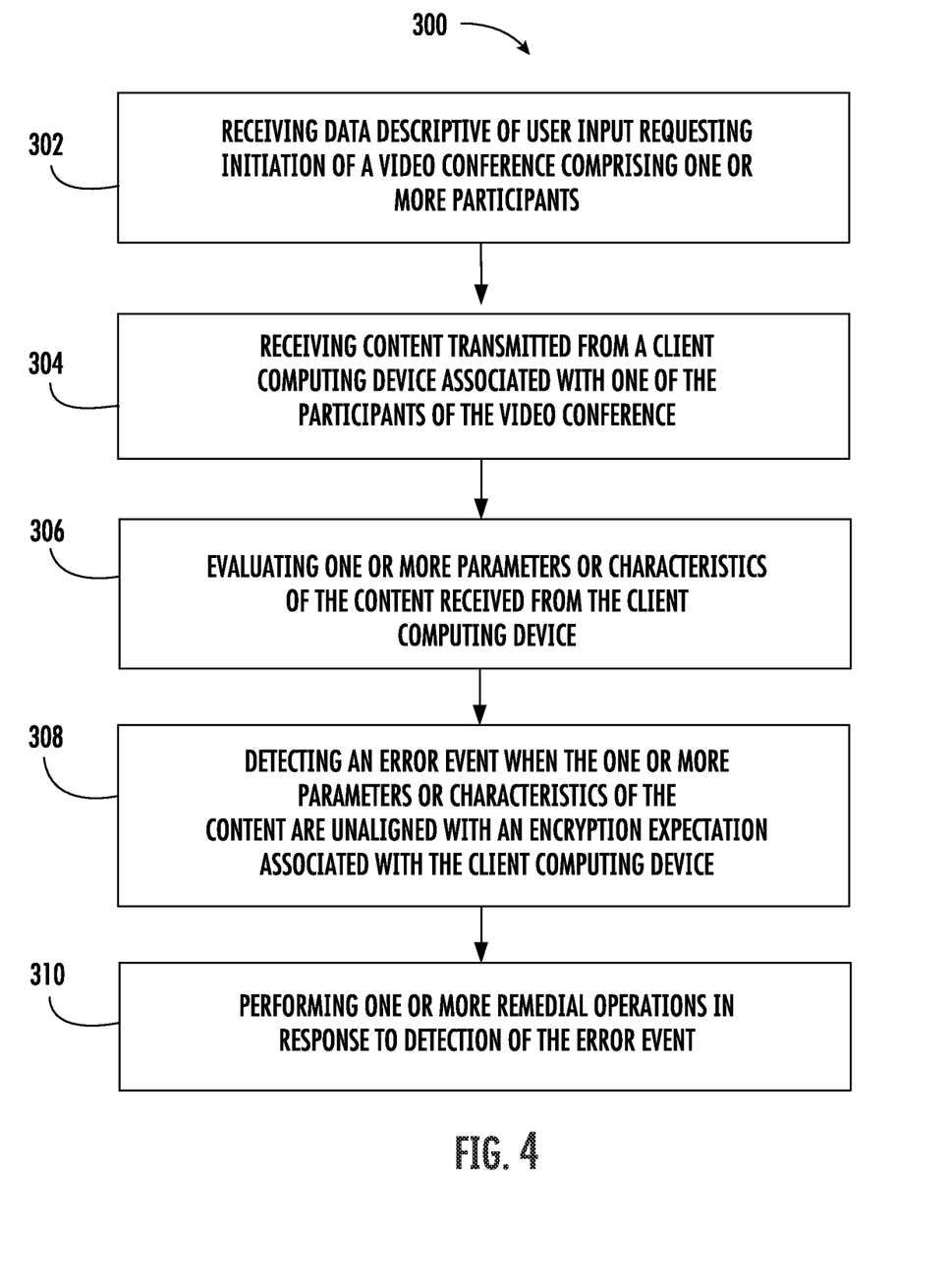
FIG. 4 depicts a flow diagram for using a watchdog on a video conferencing computing system to ensure that all data is encrypted from end-to-end according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can receive user data descriptive of user input. In particular, the data descriptive of user input can be directed to requesting initiation of a video conference comprising one or more participants.

At 304, the computing system can receive content. In particular, the content can be transmitted from one or more client computing devices. Even more particularly the client computing devices can be associated with the one or more participants of the video conference. For example, the content can be received by a watchdog component. For example, in some implementations, the watchdog component can be implemented by each edge server that is connected to one of the client devices. For example, an edge server can be a server that is part of the group of servers that is facilitating or hosting the video conference and may correspond to the initial server (e.g., from the perspective of data flow) that is aware of the type of content associated with the data being transmitted (e.g., not simply passing the data along as part of backhaul network such as load-balancing servers or the like). In other implementations, the watchdog component may not necessarily be located at the edge server but instead could be implemented in a more centralized location or at the client device.

At 306, the computing system can evaluate one or more parameters or characteristics of the content received from the one or more client computing devices. For example, the watchdog component can perform an initial screening prior to establishing/facilitating the video conference between the client devices to ensure that a data stream for a participant is appropriately encrypted. In particular, in some implementations, after receiving the user input associated with initiating a video conference, the watchdog component can verify parameters used for an initial video conferencing setup against expected parameters. This process can in some instances be referred to as call setup parameter verification. If the parameters used match the expectations for E2EE calls in the system, then the watchdog can permit the call to be established. However, if the parameters used by a client do not match the expectations for E2EE calls in the system, then the watchdog can deny or otherwise prevent the call from being established. As another example, the watchdog component can evaluate characteristics of the data received from each client device continuously during the video conference to determine whether encryption expectations are met. As one particular example, the watchdog component can continuously evaluate the data received from each client to determine whether an expected protocol is being used. Specifically, in some examples, a portion of a stream of bytes can be analyzed to determine the protocol(s) used by the transmitting device (e.g., the client device). Thus, the content can be monitored for the use of an expected protocol.

At 308, the computing system can detect an error event. In particular, the error event can include when the one or more parameters or characteristics contained within the content is unaligned with an encryption expectation. As one example, the computing system can analyze other static characteristics or dynamic characteristics of the data stream received from each client device to determine whether encryption expectations are met. As one example, a counter parameter included in a client device's data stream can be expected to increase in a particular fashion (e.g., monotonically). Therefore, if the counter parameter behaves in an unexpected way (e.g., increases in an irregular or outside of a window of non-monotonic fashion), then an error event can be detected. In particular, possible natural packet reordering as well as network problems can be taken into account when determining if the counter parameter is behaving in an unexpected way. Other static characteristics or dynamic characteristics of the data stream can be monitored as well. As another example, the watchdog component can look for a known byte string within an encrypted stream and detect an error event if the known byte stream is identified. In particular, each client device can be instructed to include a known byte stream in its data prior to encryption of the data by the client device. Then, following encryption of the data by the client device, the encrypted data stream can be received from the one or more client computing devices and evaluated by the watchdog component. If the known byte string is detected by the watchdog, it can be an indication that the data associated with the client computing device has not been correctly encrypted.

At 310, the computing system can perform remedial operations. In particular, the computing system can perform remedial operations in response to detecting an error event. As one example, remedial operations can include disconnecting the one or more clients transmitting the content unaligned with the encryption expectations associated with the error event. Stated differently, if data associated with a particular client does not meet expectations, then the particular client can be disconnected from the call. As another example, remedial operations can include providing an error message for display to one or more client computing devices. In one example, the error message can be provided to the one or more client computing devices associated with the error event. In another example, the error message can be provided to every client computing device participating in the video conference. As yet another example, remedial operations can include preventing the connection of the one or more clients transmitting the content unaligned with the encryption expectations associated with the error event. For example, if the call setup parameters for a particular client do not meet expectations, then the particular client can be denied entry to the video conference. As yet another example, remedial operations can include generating a log of the error event. The log can provide a record that can be used to determine when a conference was and was not E2EE. As yet another example, remedial operations can include any user-defined action input by the user. For example, users can define actions to be taken (or not) in response to detection of an error event.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for improving reliability of end-to-end encryption in a video conference, the method comprising:
   receiving, by a computing system comprising one or more computing devices, data descriptive of user input requesting initiation of a video conference comprising one or more participants;
   receiving, by the computing system, content transmitted from a client computing device associated with one of the participants of the video conference;
   evaluating, by the computing system, one or more parameters or characteristics of the content received from the client computing device;
   detecting, by the computing system, an error event when the one or more parameters or characteristics of the content are unaligned with an encryption expectation associated with the client computing device, wherein the content comprises at least an encrypted stream, wherein the error event comprises detecting a known byte string within the encrypted stream received from the one or more client computing devices, wherein detecting the known byte string is indicative of the content being incorrectly encrypted; and
   performing, by the computing system, one or more remedial operations in response to detection of the error event.

2. The computer-implemented method of claim 1, wherein the content is transmitted to a watchdog component, wherein the watchdog component is located on an edge server comprising a first server within a video conference network to receive content from the one or more participants.

3. The computer-implemented method of claim 1, wherein performing the remedial operations comprises disconnecting the one or more clients transmitting the content unaligned with the encryption expectation associated with the error event.

4. The computer-implemented method of claim 1, wherein performing the remedial operations comprises providing an error message for display to one or more client computing devices.

5. The computer-implemented method of claim 4, wherein:
   providing the error message comprises providing an error message to the client computing device associated with the error event.

6. The computer-implemented method of claim 4, wherein:
   providing the error message comprises providing an error message to every client computing device participating in the video conference.

7. The computer-implemented method of claim 1, wherein performing remedial operations comprises preventing a connection of the one or more clients transmitting the content unaligned with the encryption expectation associated with the error event.

8. The computer-implemented method of claim 1, wherein evaluating, by the computing system, the one or more parameters or characteristics of the content received from the one or more client computing devices comprises:
verifying, by the computing system, parameters used for an initial video conferencing setup against expected parameters.

9. The computer-implemented method of claim 1, wherein:
evaluating, by the computing system, one or more parameters or characteristics of the content received from the one or more client computing devices comprises determining whether a protocol is used by the client computing device.

10. A computing system, comprising:
one or more processors; and
one or more non-transitory, computer-readable media that store instructions that when executed by the one or more processors cause the computing system to perform operations, the operations comprising:
receiving, by a computing system comprising one or more computing devices, user input initiating a video conference comprising one or more participants;
receiving, by the computing system, content transmitted from one or more client computing devices associated with the one or more participants of the video conference to a watchdog, wherein the watchdog is located on an edge server;
monitoring, by the computing system, the content from one or more client computing devices as the content is transmitted;
detecting, by the computing system, an error event, wherein the error event comprises content contained within the content unaligned with an encryption expectation being transmitted from one or more client computing devices, wherein the content comprises at least an encrypted stream, wherein the error event comprises detecting a known byte string within the encrypted stream received from the one or more client computing devices, wherein detecting the known byte string is indicative of the content being incorrectly encrypted; and
performing, by the computing system, remedial operations.

11. The computing system of claim 10, wherein the edge server comprises a first server within a video conference network to receive content from the one or more participants.

12. The computing system of claim 10, wherein remedial operations comprises, disconnecting the one or more clients transmitting the content unaligned with the encryption expectation associated with the error event.

13. The computing system of claim 10, wherein remedial operations comprises, providing an error message for display to one or more client computing devices.

14. The computing system of claim 10, wherein remedial operations comprises, preventing a connection of the one or more clients transmitting the content unaligned with the encryption expectation associated with the error event.

15. One or more non-transitory computer-readable media that store instructions that, when executed by one or more processors of a computing system, cause the computing system to perform operations comprising:
receiving, by a computing system comprising one or more computing devices, user input initiating a video conference comprising one or more participants;
receiving, by the computing system, content transmitted from one or more client computing devices associated with the one or more participants of the video conference to a watchdog, wherein the watchdog is located on an edge server;
monitoring, by the computing system, the content from one or more client computing devices as the content is transmitted;
detecting, by the computing system, an error event, wherein the error event comprises content contained within the content unaligned with an encryption expectation being transmitted from one or more client computing devices, wherein the content comprises at least an encrypted stream, wherein the error event comprises detecting a known byte string within the encrypted stream received from the one or more client computing devices, wherein detecting the known byte string is indicative of the content being incorrectly encrypted; and
performing, by the computing system, remedial operations.

16. The computing system of claim 15, wherein the edge server comprises a first server within a video conference network to receive content from the one or more participants.

17. The computing system of claim 15, wherein remedial operations comprises, disconnecting the one or more clients transmitting the content unaligned with the encryption expectation associated with the error event.

18. The computing system of claim 15, wherein remedial operations comprises, providing an error message for display to one or more client computing devices.

19. The computing system of claim 15, wherein remedial operations comprises, preventing a connection of the one or more clients transmitting the content unaligned with the encryption expectation associated with the error event.

* * * * *